Oct. 5, 1954 R. F. SCHWARTZ 2,691,105
TUNING SYSTEM
Filed July 26, 1951
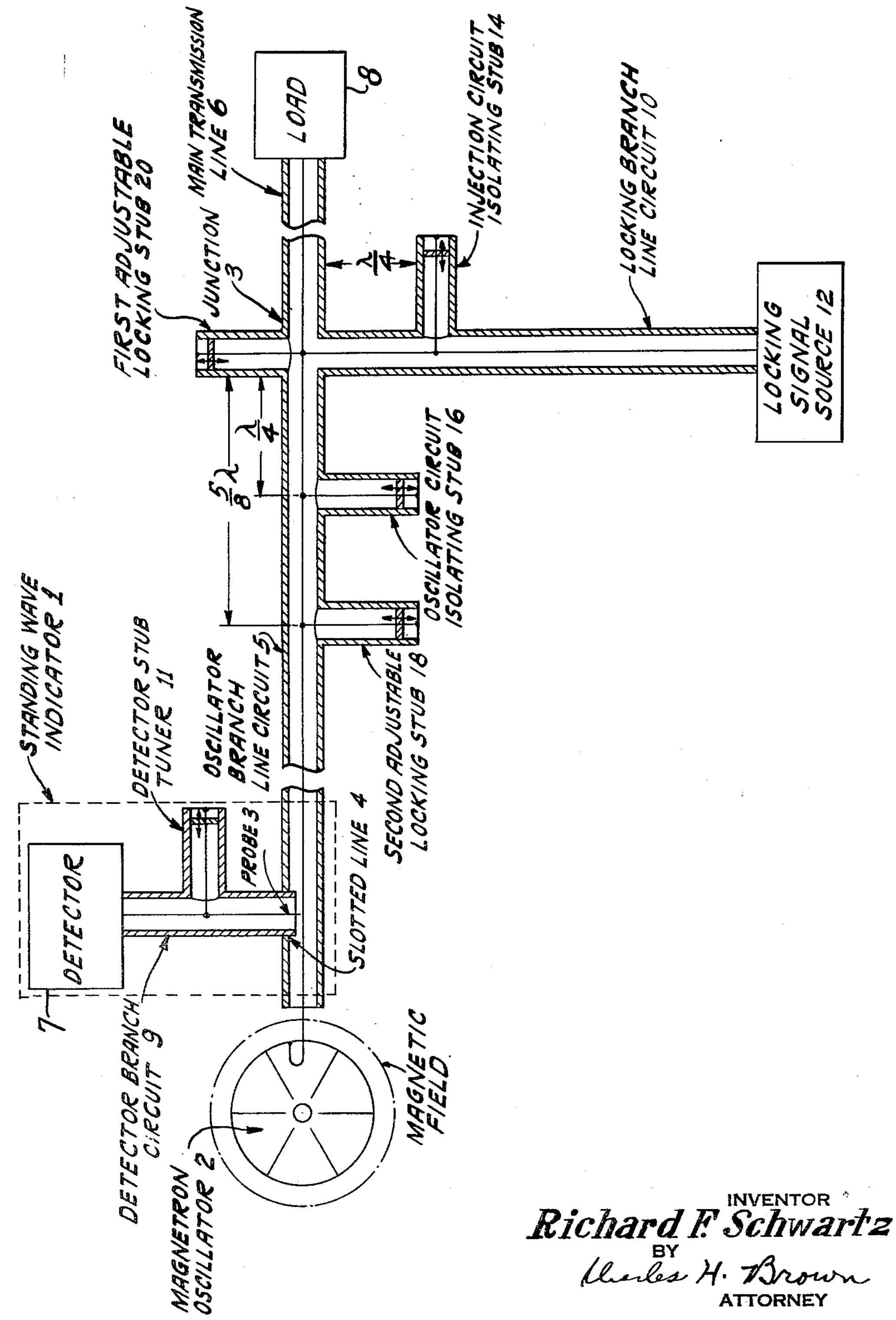
INVENTOR
Richard F. Schwartz
BY
Charles H. Brown
ATTORNEY Patented Oct. 5, 1954 2,691,105

UNITED STATES PATENT OFFICE 2,691,105

TUNING SYSTEM

Richard Frederick Schwartz, Gibbsboro, N. J., assignor to Radio Corporation of America, a corporation of Delaware Application July 26, 1951, Serial No. 238,665

2 Claims. (Cl. 250—36)

This invention relates generally to radio systems having a plurality of transmission line feeders coupled to a common utilization circuit, and more particularly to a method of and means for tuning or adjusting these transmission line feeders. In its most specific aspect, the invention relates to a radio transmitting system which is excited by an ultra high frequency oscillator, in turn stabilized or locked in frequency by a stable source of radio frequency, both oscillator and injection source being coupled over separate transmission lines to a common transmission line extending to an antenna or other load.

The locking of an oscillator to a standard RF source is relatively simple if the oscillator has a control grid as in the case of common amplifier tubes such as triodes, tetrodes, or pentodes. In such cases the coupling between the oscillator and the locking source can be effected on the grid input. If the oscillator, however, is a diode like a klystron or cavity type magnetron, where the oscillating cavity has no control input of the grid type, the locking presents a different problem. In such cases the locking power must be introduced into the cavity where the oscillator power is produced. One such system disclosing a magnetron and a method of locking the same is described in the copending application of Leslie L. Koros, Ser. No. 177,455, filed August 3, 1950. In this Koros system, the locking frequency power is produced by a relatively low power highly stable RF source and is injected into the high power oscillator cavity via the main transmission line connecting the oscillator cavity to the load. In such systems, it is desirable to preliminarily tune the oscillator and the locking signal source independently under non-locking conditions while each is decoupled from the other. Since the transmission line at these frequencies is usually coaxial tubing, to disconnect one transmission line from the other involves a major plumbing problem with corresponding inconvenience and delay.

An object of the present invention is to eliminate the necessity for a mechanical disconnection of the transmission lines during the preliminary tuning of a system of the foregoing type under non-locking conditions.

Another object of the present invention is to utilize the same apparatus for preliminarily tuning under non-locking conditions to aid in the adjustment of the system for proper operation under normal locking conditions.

A further object is to enable the effective tuning of two or more transmission lines associated with a common radio transmitter with a minimum of interaction between transmission lines during the tuning process.

The invention is hereinafter described by way of example only in connection with a frequency control system utilizing a magnetron oscillator generating power of a given wavelength, and a highly stable locking signal source generating power of the same wavelength, both generators being joined through individual transmission lines or branches to a main transmission line extending to an antenna or any other load. An adjustable line stub is provided for each of the aforesaid individual transmission lines. Each of these stubs is located one quarter wavelength from the junction of the main transmission line and the individual lines associated with the magnetron oscillator and the locking signal source. Adjusting one of these stubs to provide a low impedance at its base effectively prevents the branch line directly connected thereto from having any effect on the other line during the tuning of said other line, since the quarter wavelength spacing between the junction and the stub acts as a transforming section making the low impedance appear as a very high impedance to the circuit being tuned.

Other objects, features, and advantages will appear in the subsequent detailed description which is accompanied by a drawing, wherein the sole figure illustrates a radio transmitting system embodying a tuning system in accordance with a preferred embodiment of the present invention.

Referring to the figure, there is shown a stabilized microwave radio transmitting system, including a resonant cavity type magnetron oscillator 2, a standing wave indicator 1, an oscillator branch coaxial transmission line circuit 5, a junction 3, a main coaxial transmission line 6, and a load 8. Of course, another cavity type oscillator such as the klystron, could be used. At junction 3, the junction of the transmission line 6 with the oscillator branch circuit 5, there is coupled by a locking branch coaxial transmission line circuit 10, a highly stable locking signal source 12, to generate the power which is injected into the cavity of the magnetron 2 to lock the magnetron oscillator frequency to the frequency of the stabilized locking signal source. The locking source can be a crystal oscillator and a suitable number of multiplier stages to produce the desired frequency output. An adjustable injection circuit isolating stub 14 connected to the locking branch line circuit 10 isolates the injection circuit (comprising the locking branch circuit 10, the locking signal source 12, and the said injection circuit isolating stub 14) during the preliminary tuning of the magnetron oscillator 2. The oscillator circuit isolating stub 16 isolates the oscillator circuit (which includes the magnetron oscillator 2, the standing wave indicator, the oscillator branch circuit 5, and said oscillator circuit isolating stub 16) during the tuning of the locking signal source 12. The second adjustable locking stub 18 connected to the oscillator branch line circuit 5 (which completes the list of components comprising the oscillator circuit) together with the first adjustable locking stub 20 connected to junction 3, and the isolating stubs 14 and 16 are utilized to aid in matching the oscillator 2 to the load 8, and to aid in tuning the system for optimum locking condition. The standing wave indicator 1, comprising the detector 7 (which may be a diode detector for example), the detector branch line circuit 9, the slotted line 4, the detector stub tuner 11 and the probe 13 inserted into the slotted line 4, is employed as an indicating device to indicate voltage standing wave ratio. Of course, other indicating devices could be used, for example, a reflectometer.

In the operation of the system shown in the figure, for proper stabilization it is necessary to tune the locking source 12. The oscillator circuit must be isolated electrically or mechanically from the rest of the system during this step in the operation of the system. Since a mechanical disconnection is impractical, this is accomplished electrically utilizing the present invention.

It should be remembered that a straight section of line a half wavelength long or a multiple of a half wavelength has a very low impedance at one end if its far end is short-circuited, and a very high impedance at one end if its far end is open-circuited; and that a quarter wavelength line, or an odd multiple thereof, closed at the far end has a very high impedance at the other or open end, while a quarter wavelength line, or an odd multiple thereof, open at the far end has a very low impedance at the other end thereof. The injection circuit isolating stub 14 is adjusted to have an effective length of a quarter wavelength producing a very high impedance at its connection to branch line 10. In this "neutral" position it is non-existent as far as the locking signal source 12 is concerned. The first adjustable locking stub 20 is similarly set at a "neutral" position, that is, it is made to be effectively a quarter wavelength long. The oscillator circuit isolating stub 16 is set to the "reject" position, that is, a half wavelength in length utilizing the standing wave detector circuit to indicate minimum voltage corresponding to maximum rejection; the low impedance at the attached end of said stub 16 being transformed by the quarter wavelength section between the junction 3 and said stub 16 to appear as an open-circuit having a very high impedance as seen from the junction 3. In setting the oscillator circuit isolating stub 16 to "reject" position it is possible to reject the locking signal to such an extent that no indication of the locking signal appears on the standing wave indicator 1. The locking signal source 12, therefore, works into a matched load independent from the oscillator circuit, and may be tuned for maximum output without further difficulty.

After the locking source 12 is tuned, it is desirable to preliminarily tune and operate the magnetron oscillator 2 with a matched load and without locking, in order to attain a stable temperature condition. To effectively isolate the injection circuit from the rest of the system, the adjustable injection circuit isolating stub 14, with its far end short-circuited, connected to the locking branch circuit line 10 at a distance of a quarter of wavelength from the said junction 3, is adjusted to a half wavelength, the "reject" position, producing a very low impedance or short-circuit at the connected end. The short-circuit is then transformed by the quarter wavelength section between the junction 3 and said stub 14 to appear as an open-circuit at the junction 3 looking toward the injection circuit. With the magnetron oscillator 2 in operation and the injection circuit isolating stub 14 in the "reject" position, it is possible to obtain a voltage reduction in the said injection circuit of the order of a hundred to one or more, utilizing measurement instruments not shown. Therefore, the injection circuit does not exist so far as the magnetron oscillator 2 is concerned with the injection circuit isolating stub 14 in the "reject" position, and the said oscillator 2 can be preliminarily tuned and matched to the load 8.

To properly match the oscillator to the load 8 with the injection circuit isolated the first locking stub 20 connected to the junction 3, the second locking stub 18 connected to the oscillator branch circuit 5 at a distance of five-eighths of a wavelength away from the junction 3, and the oscillator circuit isolating stub 16 connected to the oscillator branch circuit 5 at a distance of a quarter of a wavelength from the junction 3 are adjusted to produce a unity standing wave ratio at the slotted line as indicated by the standing wave indicator 1. The three-eighths of a wavelength spacing between stubs 16 and 18 allows for a maximum amount of impedance adjustment. The oscillator circuit isolating stub 16, and the two locking stubs 18 and 20 are thereby in the "matching position," the lengths of the stubs thus being determined experimentally.

For locking the oscillator 2, the injection circuit isolating stub 14 is put in "neutral," that is adjusted to be effectively a quarter wavelength in length, and the injection source is placed in operation. Then all the stubs except injection circuit isolating stub 14 are adjusted experimentally employing a frequency spectrum analyzer to indicate when locking occurs, as explained in the Leslie L. Koros application cited above.

Alternatively, the same functions may be accomplished with open-circuit type tuning stubs. The "reject" position, in this case, is a quarter wavelength, and the "neutral" position is a half wavelength.

If the locking source signal frequency is harmonically related to the magnetron oscillator frequency, other than being equal to it, the spacing and length of some of the stubs are changed accordingly. For example, if the locking signal source is to be operated at half the frequency of the magnetron oscillator 2 instead of equal to it, the oscillator circuit isolating stub 16 would be attached to the oscillator branch line circuit 5 at a point which is a quarter of the wavelength of the locking source frequency removed from the junction 3, or twice the former spacing, and the length of the said stub 16 would be doubled for the position of rejection. Stubs 14, 18, and 20 are not changed in position in respect to the branch line circuits, but the neutral positions of stubs 14 and 20 would then be twice their former lengths when the locking source 12 is tuned.

The invention is equally applicable in the case where the locking signal source frequency is a multiple of the frequency of the magnetron oscillator 2, as where the locking source frequency is twice the magnetron oscillator operating frequency. Of course, the invention is not restricted to concentric transmission lines, but can be utilized in connection with open wire circuits, waveguides, and other similar transmission lines when a mechanical disconnection is undesirable. The invention is particularly useful at ultra high frequencies, for example in the range of 500 megacycles to 1000 megacycles and higher.

What is claimed is:

1. Apparatus for tuning and putting into operation a stabilized frequency transmitting system comprising a magnetron oscillator for generating radio frequency waves of a given wavelength, an oscillator branch line coupled to said oscillator, a load, a main transmission line coupling said load to the oscillator branch line, a standing wave indicator, said standing wave indicator including a slotted line inserted into the oscillation branch line, a highly stable locking signal source for generating radio frequency waves having a wavelength equal to said given wavelength, a locking branch line coupling the locking signal source to the junction of the main transmission line and the oscillator branch line for injecting energy of a highly stable frequency from said locking source into the magnetron oscillator to effectuate locking of the magnetron oscillator frequency at the highly stable frequency of the locking source, an adjustable injection circuit isolating stub connected to the locking branch line at a point spaced a quarter of said given wavelength from said junction, said injection circuit isolating stub being adjustable to a length of a half of said given wavelength with the unconnected end shortcircuited to effectuate an equivalent electrical short circuit at the connected end, an adjustable oscillator circuit isolating stub connected to the oscillator branch line at a point spaced a quarter of said given wavelength from said junction, said oscillator circuit isolating stub being adjustable to a length of a half of said given wavelength with the unconnected end shortcircuited to effectuate an equivalent electrical short circuit at the connected end, a first adjustable locking stub connected to the junction, and a second adjustable locking stub connected to the oscillator branch line at a point spaced five eighths of said given wavelength from said junction.

2. Apparatus for tuning a stabilized frequency transmitting system comprising a magnetron oscillator for generating radio frequency waves of a given wavelength, an oscillator branch line coupled to the oscillator, a load, a main transmission line coupling said load to the oscillator branch line, a highly stable locking signal source for generating radio frequency waves having a wavelength harmonically related to said given wavelength, said harmonic relationship including a ratio of one to one, a locking branch line coupling the locking signal source to the junction of the main transmission line and the oscillator branch line for injecting energy of a highly stable frequency from said locking source into said oscillator to effectuate locking of the oscillator frequency, an adjustable injection circuit isolating means connected to the locking branch line to provide an equivalent electrical open circuit looking from the said junction to said locking branch line, thereby isolating said locking branch line from the main transmission line and from the oscillator branch line during the tuning of the oscillator under non-locking conditions to thereby provide for a matched load for said oscillator, said isolating means consisting of a short-circuited stub adjusted to a length of a half of said given wavelength and connected to the locking branch line at a point spaced from said junction a distance of a quarter of said given wavelength, an adjustable oscillator circuit isolating means connected to the oscillator branch line to provide an equivalent electrical open circuit looking from said junction to the oscillator branch line, thereby isolating said oscillator branch line from the locking branch line and from the main transmission line during the tuning of the locking signal source under non-locking conditions to thereby provide for a matched load for the said source, the last-named isolating means consisting of a short-circuited stub adjusted to a length of a half-wavelength for said locking source frequency and connected to the oscillator branch line at a point spaced from said junction a distance of a quarter-wavelength for said locking source frequency, an adjustable locking stub connected to said junction, and another adjustable locking stub connected to said oscillator branch line at a point spaced from said junction a distance of five-eighths of said given wavelength, said locking stubs and isolating means being adjusted, during normal operation of the transmitting system, in such manner that locking of the oscillator frequency is effected by said locking signal source.

References Cited in the file of this patent

UNITED STATES PATENTS

| Number | Name | Date |
|---|---|---|
| 2,189,549 | Hershberger | Feb. 6, 1940 |
| 2,412,315 | Brown | Dec. 10, 1946 |
| 2,537,314 | Glass | Jan. 9, 1951 |
| 2,565,112 | Altar | Aug. 21, 1951 |